United States Patent [19]

Shibayama

[11] Patent Number: 5,038,886
[45] Date of Patent: Aug. 13, 1991

[54] CONTROL ARRANGEMENT FOR ENGINE/TRANSMISSION POWER UNIT MOUNT

[75] Inventor: Takashi Shibayama, Isehara, Japan

[73] Assignee: Nissan Motor Co., Ltd., Yokohama, Japan

[21] Appl. No.: 524,367

[22] Filed: May 16, 1990

[30] Foreign Application Priority Data

May 22, 1989 [JP] Japan ................................ 1-128183

[51] Int. Cl.$^5$ ............................................... B60K 5/00
[52] U.S. Cl. ..................................... 180/292; 180/300; 180/312; 364/424.1; 192/3.3
[58] Field of Search ............... 248/638, 550; 192/3.29, 192/3.3; 180/312, 293, 291, 292, 299, 300, 381; 364/424.1

[56] References Cited

U.S. PATENT DOCUMENTS 4,893,800  1/1990  Tabata .............................. 267/140.1

FOREIGN PATENT DOCUMENTS 62-17440   1/1987  Japan.
62-20929   1/1987  Japan.
62-137467  6/1987  Japan.

Primary Examiner—David M. Mitchell
Assistant Examiner—Martin Gerich
Attorney, Agent, or Firm—Foley & Lardner

[57] ABSTRACT

The status of a lock-up clutch included in an automotive power unit T/C is monitored. In the event that the lock-up clutch is partially locked up or conditioned to produce so called "slip lock-up", ERF (electroheopectic fluid) filled engine mounts are conditioned to produce an increased amount of rigidity, while in the event that the lock-up clutch is fully engaged the engine mounts are induced to assume a more flexible state.

In addition to this engine idling and shake, vibration can be attenuated by sensing the relative displacement between the power unit and the chassis.

7 Claims, 10 Drawing Sheets

FIG.7

ENGINE MOUNT RIGIDITY TABLE 1

Th

| 15 | | | | | | |
|---|---|---|---|---|---|---|
| 20 | 20 | | | | | |
| 25 | 25 | 35 | | | | |
| 20 | 20 | 30 | | | | |

ENGINE MOUNT RIGIDITY TABLE 2

Th

| 8 | 7 | 3 | | | | |
|---|---|---|---|---|---|---|
| 9 | 6 | 5 | | | | |
| 8 | 6 | 4 | | | | |
| 7 | 5 | 5 | | | | |

V

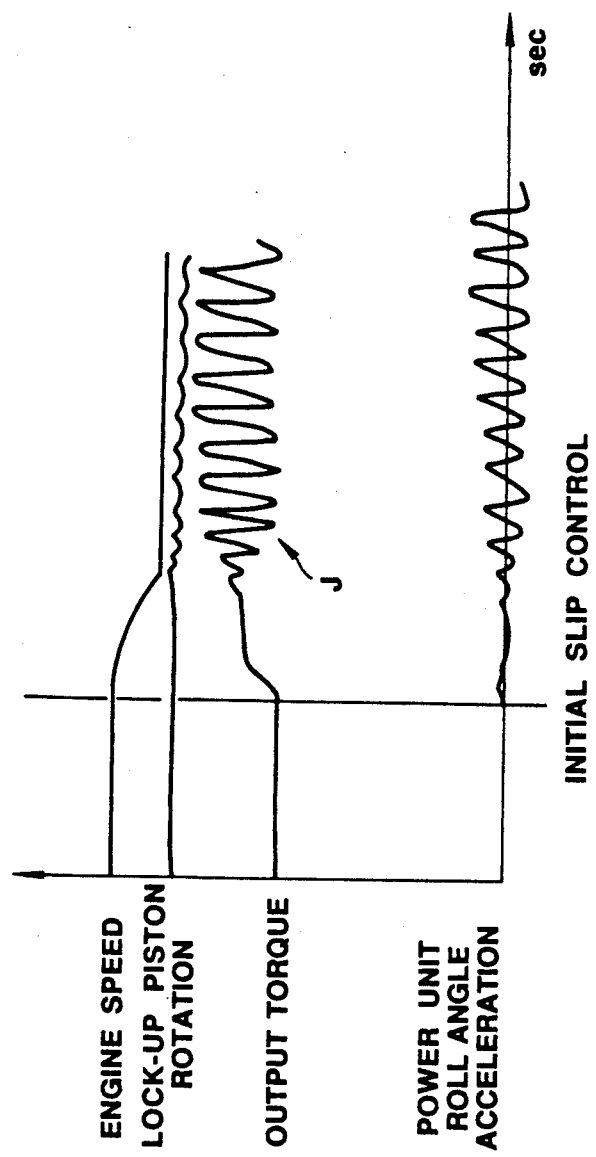

5,038,886

CONTROL ARRANGEMENT FOR ENGINE/TRANSMISSION POWER UNIT MOUNT

BACKGROUND OF THE INVENTION

1. Field of the Invention

The present invention relates generally to a mounting device which is used to support an automative power unit (engine and transmission) on a vehicle chassis and more specifically to a control arrangement which varies the mounting device rigidity in response to the status of a lock-up clutch included in an automotive power unit T/C (torque converter) unit.

2. Description of the Prior Art

JP-A-62-17440 discloses a mounting arrangement the rigidity of which can be varied by controlling the flow restriction between two fluid filled chambers. JP-A-62-20929 discloses an engine mount wherein the chamber arrangement is filled with an electrorheopectic fluid and the rigidity of the mount varied by applying a voltage across electrodes disposed in the chamber.

As rigidity of these types of mounts can be readily controlled, they have found application in supporting automotive power units on vehicle chassis. For example, the vibration which is produced when the engine is idling, the vibration is produced by the irregularites in the road surface which tend to be transmitted back to the engine, or engine shake type vibration, can be effectively controlled by varying the rigidity of the mount and thus varying the vibration transmission efficiency of the device. This of course permits the amount of vibration which is transmitted to the chassis to be reduced.

However, the vibration which is transmitted to the vehicle chassis is not limited to that which is produced by the engine. In the case an automatic transmission is provided with a lock-up clutch, it has been found that when said clutch is locked-up, reverberation causing vibration is transmitted from the transmission per se via the engine mounts to the chassis.

That is to say, when lock-up takes place in the manner disclosed in JP-A-62-137467, the lock-up clutch which is included in the torque converter is such as to transmit the engine torque directly to the transmission. On the other hand, when the lock-up clutch is released the torque is transmitted by way of the torque converter. When used alone the torque converter inherently smooths the torque transmission between the engine and the transmission in a manner which attenuates the tendency for the transmission to be excited by the vibration from the engine.

However, it has been found with this conventional type of lock-up control that when the lock-up arrangement is fully engaged and accelerator pedal is subject to sharp changes in the amount of depression, spikes in the transmission output shaft torque (see peaks P and Q in FIG. 15) tend to be produced. Further, as shown in FIG. 16, during fully locked up modes of operation, given that the rigidity of the engine mounts remains unchanged, the reverberation noise level in the vehicle cabin tends to undergo an undesirable increase.

On top of this, during partial lock-up clutch engagement or "slip lock-up" as it will be referred to hereinafter, the transmission output torque tends to fluctuate in the manner shown in FIG. 17 and brings about a phenomenon referred to as "lock-up jitter" J. This accordingly causes the transmission per se to vibrate in a manner which establishes another mode in which vibrational energy can be transmitted to the vehicle chassis.

Thus, although the above types of mount have been able to adequately control engine idling and shake types of vibration, the effects on noise generating vibration by the lock-up clutch has not yet been given any consideration and the isolation of the vehicle occupants from this type of problem has accordingly been wanting.

SUMMARY OF THE INVENTION

It is an object of the present invention to provide a control arrangement for an engine mount which is responsive to the engagement status of a lock-up clutch which is included in an automatic automotive transmission torque converter, and via which the rigidity of the mount can be selectively altered in a manner to attenuate the transmission of vibration to the vehicle chassis.

In brief, the above object is achieved by an arrangement wherein the status of a lock-up clutch included in an automotive power unit T/C is monitored and in the event that the lock-up clutch is partially locked up or conditioned to produce a so called "slip lock-up", ERF (electrorheopectic fluid) filled (or the like type of variable rigidity) engine mounts are conditioned to produce an increased amount of rigidity while in the event that the lock-up clutch is fully engaged the engine mounts are induced to assume a more flexible state.

In addition to this, engine idling and shake vibration can be attenuated by sensing the relative displacement between the power unit and the chassis and implementing suitable control.

More specifically, a first aspect of the present invention comprises a vehicle which includes: a power unit, the power unit including a prime mover, a transmission and a lock-up clutch which forms part of a operative connection between the prime mover and the transmission, the lock-up clutch being selectively conditionable to assume one of a non-engaged state, a partially engaged state and a fully engaged state; a mount which supports the power unit on a chassis of the vehicle, the mount being constructed and arranged such that the rigidity thereof can be selectively varied; and a control arrangement which is operatively connected with the mount and which selectively varies the rigidity of the mount in response to the engagement status of the lock-up clutch.

A second aspect of the present invention comprises a suspension control arrangement for a suspension which supports an automotive power unit on a chassis, the power unit including a prime mover, a transmission and a lock-up clutch which forms part of a operative connection between the prime mover and the transmission, the lock-up clutch being selectively conditionable to assume one of a non-engaged state, a partially engaged state and a fully engaged state, the suspension control arrangement featuring: a mount which supports the power unit on a chassis of the vehicle, the mount being constructed and arranged such that the rigidity thereof can be selectively varied between a first high rigidity level and second lower rigidity level; and a control arrangement which is operatively connected with the mount and which selectively varies the rigidity of the mount between the first and second levels in response to the engagement status of the lock-up clutch.

BRIEF DESCRIPTION OF THE DRAWINGS

FIGS. 7 and 8 shown slip lock-up and full lock-up mount rigidity control tables which are used in the engine mount control routine shown in FIG 4;

FIG. 17 is a chart which shows the fluctuations in transmission output torque which tend to take place during slip lock-up.

DETAILED DESCRIPTION OF THE PREFERRED EMBODIMENTS

Figure 1:
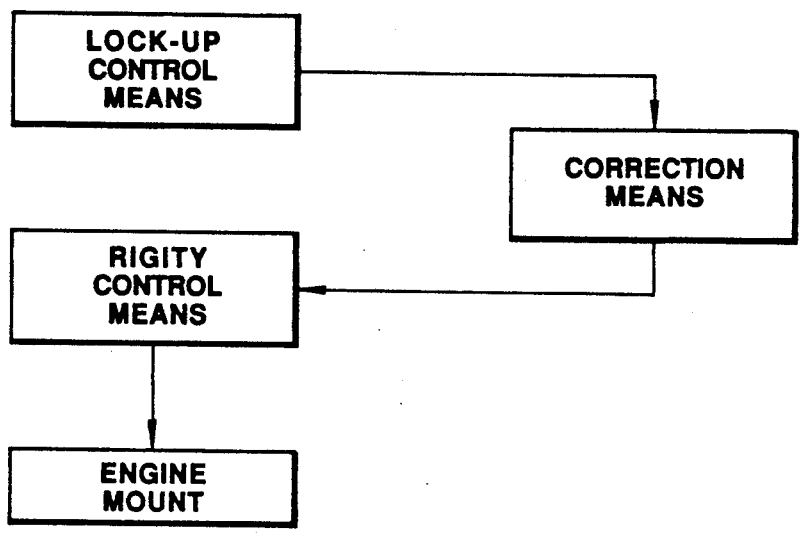
FIG. 1 is a functional block diagram which shows the conceptual arrangement of the present invention.
Figure 2:
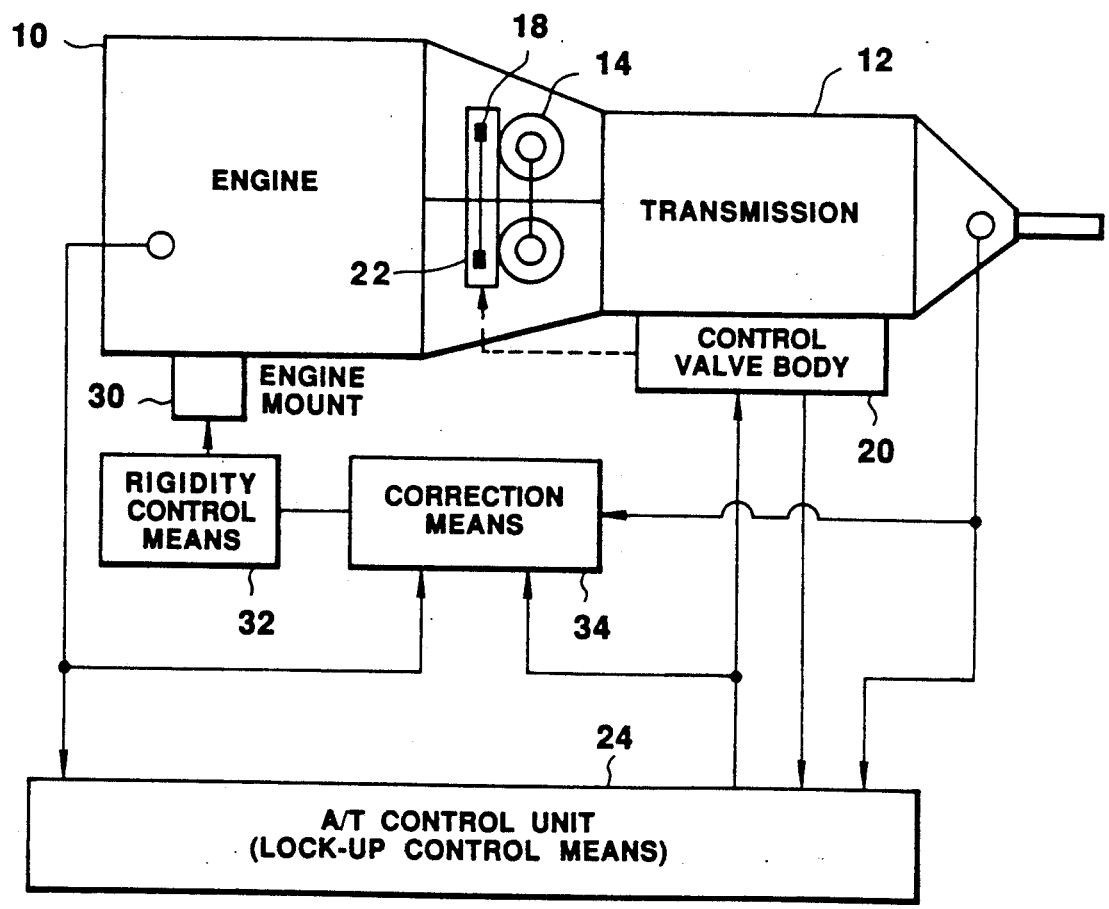
FIG. 2 is a schematic block diagram which shows an engine system which is equipped with a control arrangement according to the present invention.

FIG. 2 schematically shows an engine system to which the present invention is applied. In this arrangement an engine 10 is operatively connected to a transmission by way of a torque converter 14 and a lock-up clutch arrangement which includes a lock-up piston 18.

The operation of the transmission and the movement of the lock-up clutch piston 18 are controlled by a control valve body 20 which includes a plurality of spool valves and solenoids.

An example of a control arrangement 22 via which the lock-up clutch can be engaged and disengaged is given in JP-A-62-137467. In this instance the lock-up control arrangement 22 is arranged to be responsive to signals which are generated by a A/T control unit 24 and supplied to the control valve body 20.

When the lock-up piston 18 is fully engaged, the engine torque bypasses the torque converter 14 and is transmitted directly to the transmission.

When the lock-up piston is partially engaged in a manner which permits slippage, viz., is conditioned to produce slip lock-up, it is possible to smooth the transition between disengaged and fully engaged states, or to limit T/C slippage while still taking advantage of its torque converting characteristics, by splitting the torque transmission into two paths-one which passes through the T/C and the other which passes through the lock-up clutch.

The A/T control circuit 24 receives data input indicative of throttle position (engine load) and vehicle speed and outputs suitable control signals to the control valve body 20. These signals are such as to induces the required engagement/disengagement of the various friction elements included in the transmission 12 and thus effect shifting between gears. Based on the engine load and vehicle speed signals the A/T control unit 24 also determines the lock-up clutch mode of operation and issues commands to the lock-up control arrangement 22 via the control valve body 20. These commands are indicative of which mode (i.e. released, slip lock-up or full lock-up) has been selected.

The power unit (viz., the engine and transmission unit) is supported on a chassis by way of engine mounts 30 (only one shown) of the nature disclosed in JP-A-62-20929 and JP-A-62-17440. These mounts 30 are such that their rigidity characteristics can be selectively controlled by a signal which is generated by a rigidity control circuit or means 32.

At this point it should be noted that, in addition to the engine load and engine speed data inputs it is possible to further sense the relative displacement between the power unit and the vehicle chassis and use this data to control vibration transmission during engine idling and shake modes. An example of this type of control can be found in U.S. Pat. No. 4,893,800 issued on Jan. 16, 1990 in the name of Tabata. The content of this patent is incorporated by reference.

In connection with the present invention, when the A/T control unit 24 outputs a signal to the control valve body 20 which includes a lock-up command, the latter is transferred to the lock-up control arrangement 22 and to what is schematically depicted as correction means 34. This latter mentioned element is operatively connected with the rigidity control means 32 and further receives data inputs indicative of engine load and vehicle speed.

The correction means 34 includes and/or has access to mapped data which is logged in terms of engine speed and load and is arranged to determined, based on a comparison of the inputted data with the mapped data, to which level of rigidity the engine mount should be controlled.

Figure 3:
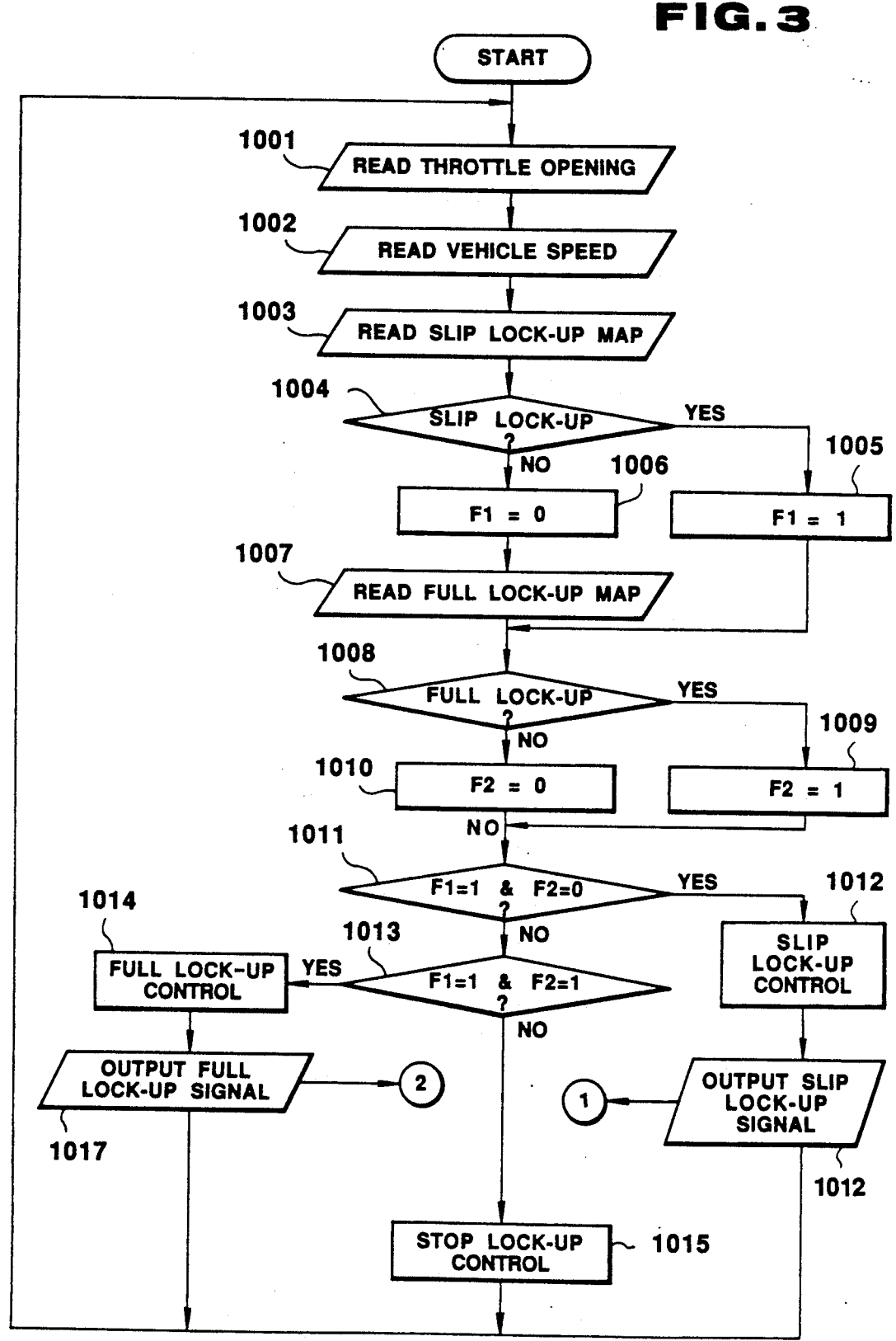
FIG. 3 is a flow chart which depicts the steps which characterize a lock-up control routine which is run a predetermined intervals in a transmission control unit.

FIG. 3 shows a flow chart which depicts the steps which are executed by a lock-up control routine which is executed in the A/T control unit 24.

Figure 5:
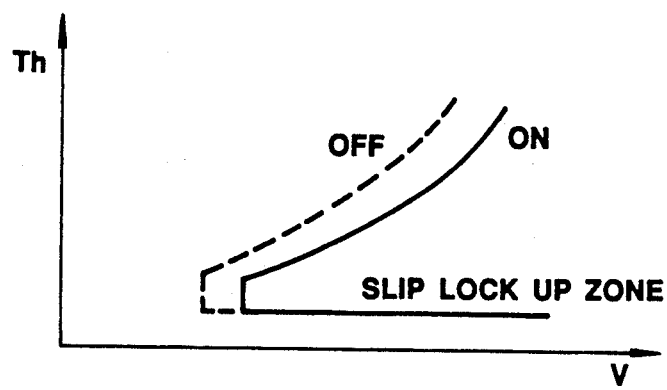
FIGS. 5 and 6 are graphs which show a slip lock-up and a full lock-up zone control maps which are used in the lock-up control routine shown in FIG. 3.

As shown, the first three steps of this routine (1001, 1002 and 1003) are such as to read the data inputs from the engine throttle sensor and the vehicle speed sensor and to read in a slip lock-up map of the nature shown in FIG. 5. At steps 1004 it is determined if slip lock-up is necessary or not. In the event that the outcome of this enquiry is affirmative, the routine goes to step 1005 wherein a flag F1 is to set a "1". However, if the outcome is negative, the routine goes to step 1006 wherein F1 is to set "0".

Figure 6:
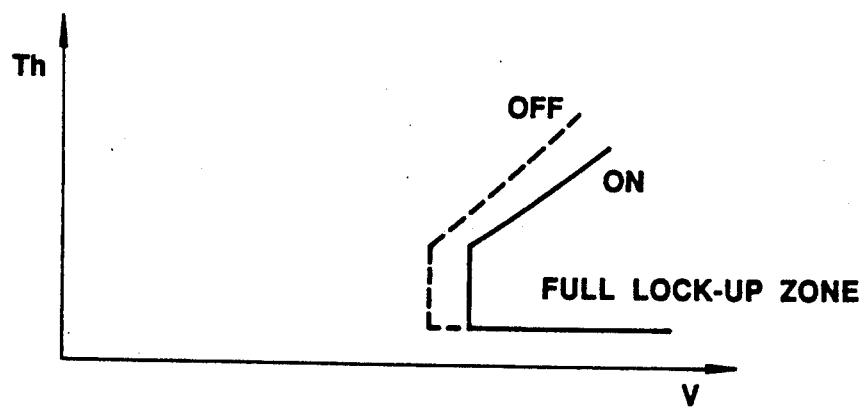

In the event that the routine flow through step 1006 it is deemed that as slip lock-up is not required, preparation should be made for full lock-up control and at step the full lock-up control map data is read out of memory at step 1007. In this instance this data takes the form depicted in FIG. 6.

In the event that F1=1, step 1007 is by-passed in that while slip lock-up control is required the full lock-up data will temporarily not be in demand.

At steps 1008 to 1011 to a full lock-up flag F2 is set. At this stage of the routine, the instant engine load and vehicle speed values are used to determine from the map data read in at step 1007 (if not is this run then in a previous one) if it is required to implement full lock-up or not.

Steps 1011 and 1013 are such as to screen the flags F1 and F2. In the case F1=1 and F2=0 (viz., only the slip lock-up flag has been set) then the routine flows through steps 1012 and 1016 which implement slip lock-up control. If both flags F1 and F2 have been set then the routine flows through steps 1014 and 1017 which implement full lock-up control irrespective of the setting of F1 to "0". On the other hand, if neither flag has been set, the routine goes to step 1015 wherein a command to stop lock-up control and release the lock-up clutch is issued.

Figure 4:
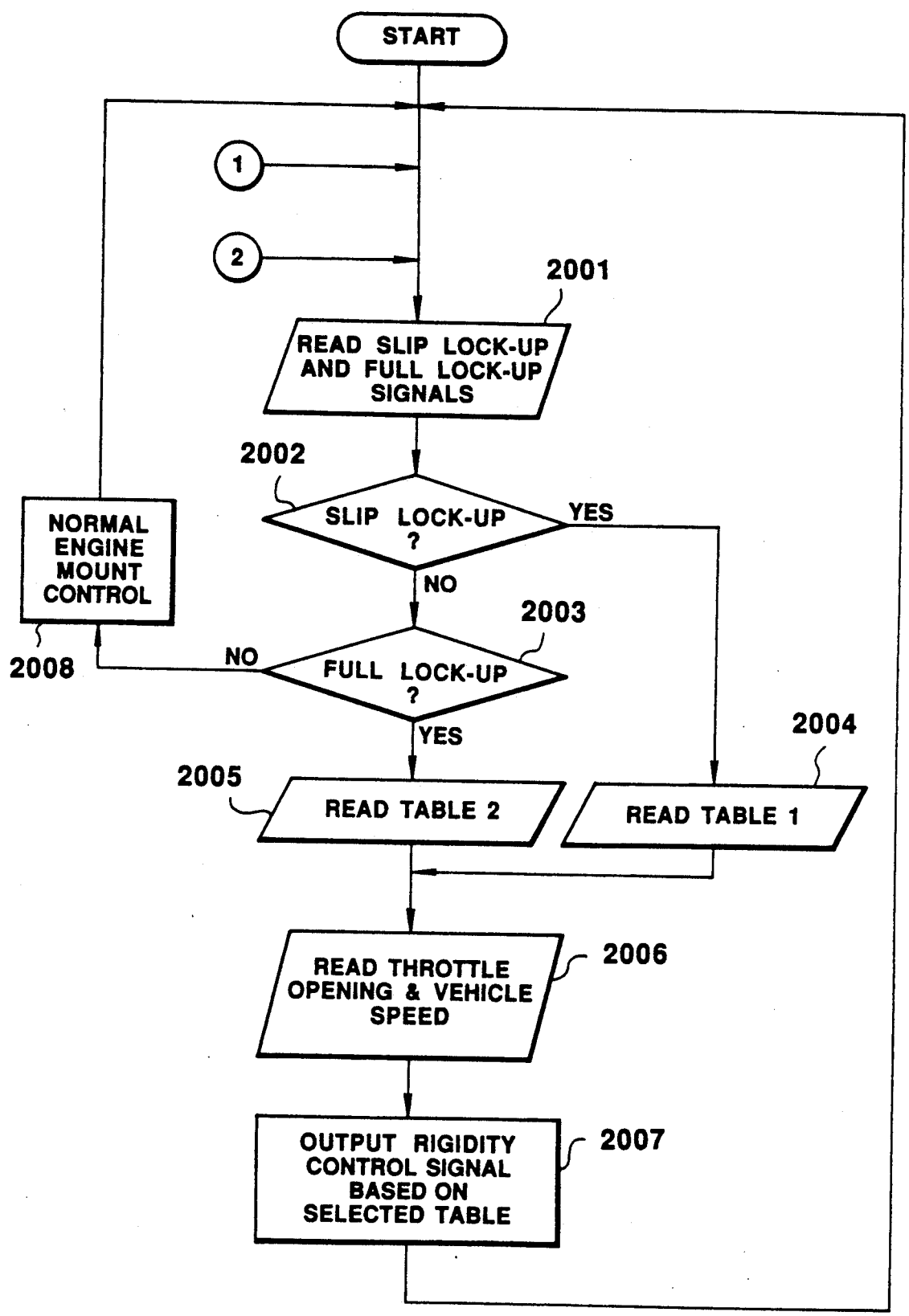
FIG. 4 is a flow chart which depicts the steps which characterize a engine mount rigidity control routine according to the present invention.

FIG. 4 depicts a rigidity control routine. As will be noted this routine is such as to receive data indicative of the decisions to implement slip and full lock-up control (step 2001) and to read table 1 (step 2004) in the event that step 2002 indicates that the most recent data indicates the need for slip lock-up. Alternatively, if the most recent input indicates that full lock-up is required then at step 2005 table 2 is read. In this instance tables 1 and 2 comprise data which can be represented in the form shown in FIGS. 7 and 8 respectively.

In the event that neither slip nor full lock-up control is required, then the routine flows to step 2008 wherein normal engine mount control is implemented.

At step 2006 the instant throttle opening and vehicle speed data is read and in step 2007 these values are used with the selected values of maps 1 and 2, to output an appropriate rigidity control from the correction means to the rigidity control means.

Following this, the routine loops back to step 2001 and re-examines the most recent lock-up control by the lock-up control routine shown in FIG. 3.

Figure 9:
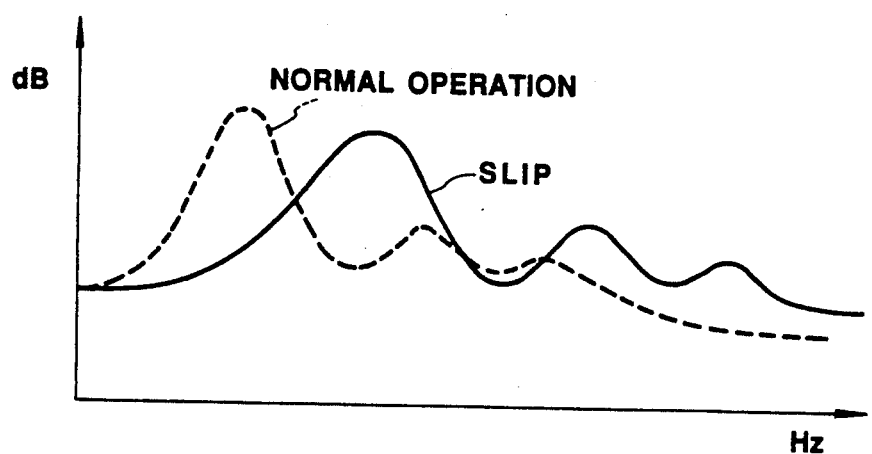
FIG. 9 is a graph which shown the resonance characteristics exhibited by the power unit during slip lock-up.
Figure 10:
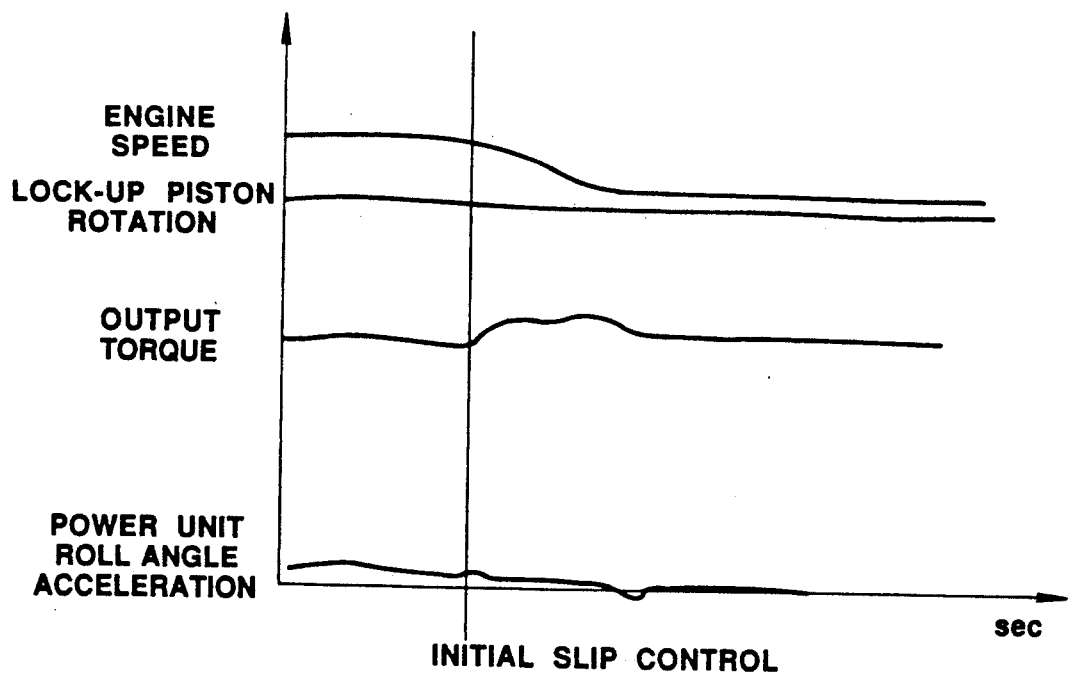
FIG. 10 is a timing chart which shows the engine speed, lock-up piston rotation, torque output and power unit-roll angle acceleration characteristics which occur during slip lock-up.

As will be appreciated from the above, with the prior art arrangements, when the lock-up clutch is conditioned to produce slip lock-up, the vibration which is produced by the rotation of the lock-up piston causes the jitter indicated by J in FIG. 17. However, with the present invention, as the rigidity of the engine mounts 30 are increased in accordance with Table 1 (see FIG. 7), the resonance frequency of the power unit (and suspension arrangement) is shifted into a higher frequency zone (see solid line trace in FIG. 9) as compared with prior art control (indicated by the chain line trace "normal operation"). Accordingly, as shown in FIG. 10 the output torque of the transmission exhibits greatly improved characteristics and is much smoother than the corresponding prior art operation.

Figure 11:
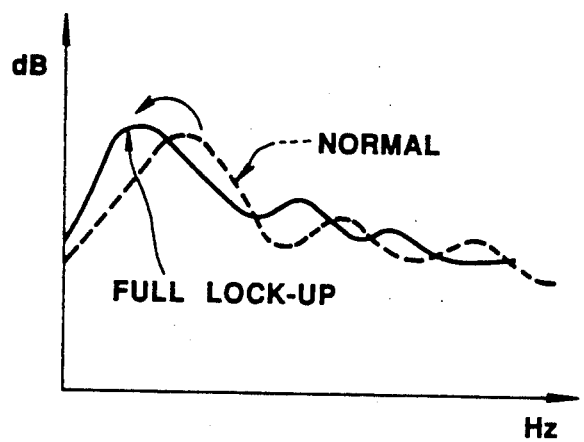
FIG. 11 is a graph which shows the resonance characteristics which are exhibited by the power unit during full lock-up operation.
Figure 12:
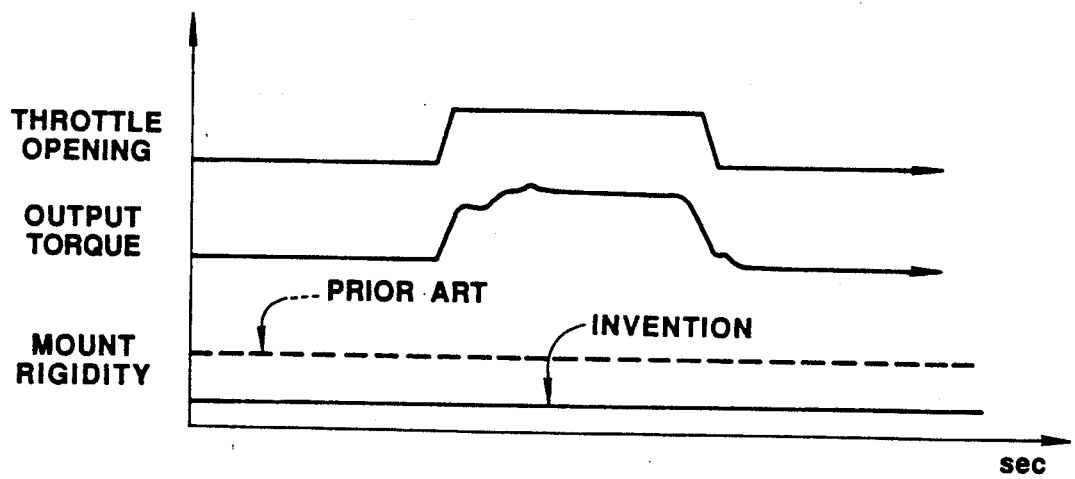
FIG. 12 is a timing chart which shows the changes in torque output and mount rigidity level which occur in response to changes in engine load.
Figure 15:
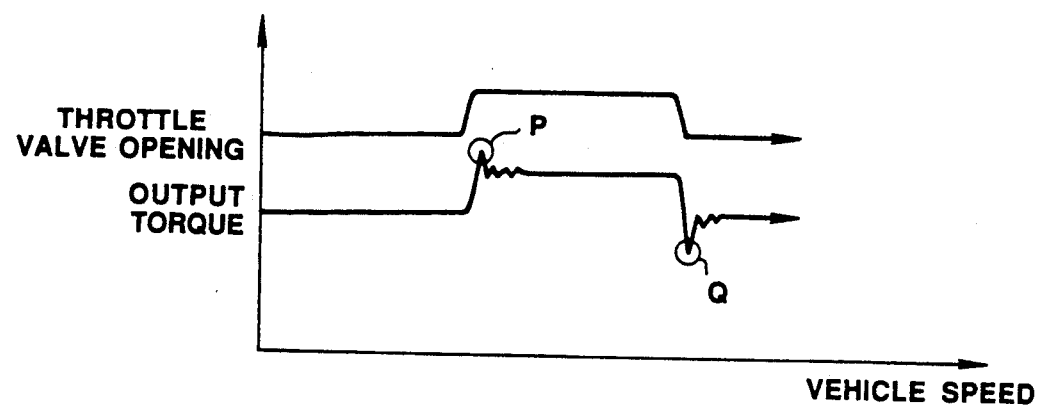
FIG. 15 is a chart which shows the spikes in torque output which tend to be produced with the prior art devices discussed in the opening paragraphs of the instant disclosure.
Figure 16:
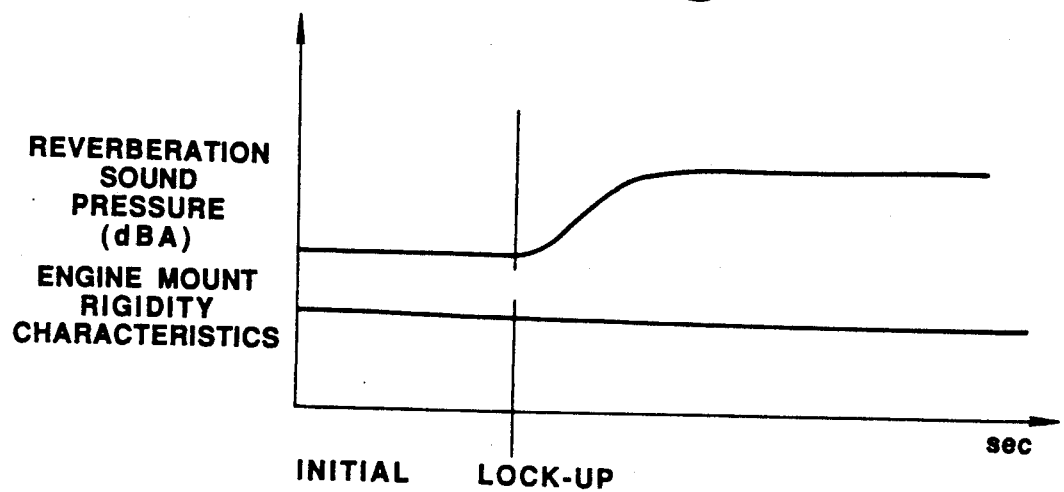
FIG. 16 is a chart which shows the change in reverberation noise level which occurs in response to the lock-up clutch being fully engaged in accordance with the prior art controlled discussed in the opening paragraphs of the instant disclosure.

In the case of full lock-up, the prior art exhibits spikes P and Q in the transmission torque output and increased cabin reverberation noise (see FIGS. 15 and 16. However, with the invention, as the engine mounts are soften in accordance with the data logged in table 2 (see FIG. 8), the resonance frequency of the power unit tends to be be shifted into a lower frequency zone as shown by the solid line trace in FIG. 11. The results of this on the torque appearing on the output shaft of the transmission are indicated in FIG. 12. As will be appreciated, the spikes which tend to be produced in with the prior art control in response to opening and closing of the engine throttle valve are all be negated by the selective softening of the engine mounts.

Figure 13:
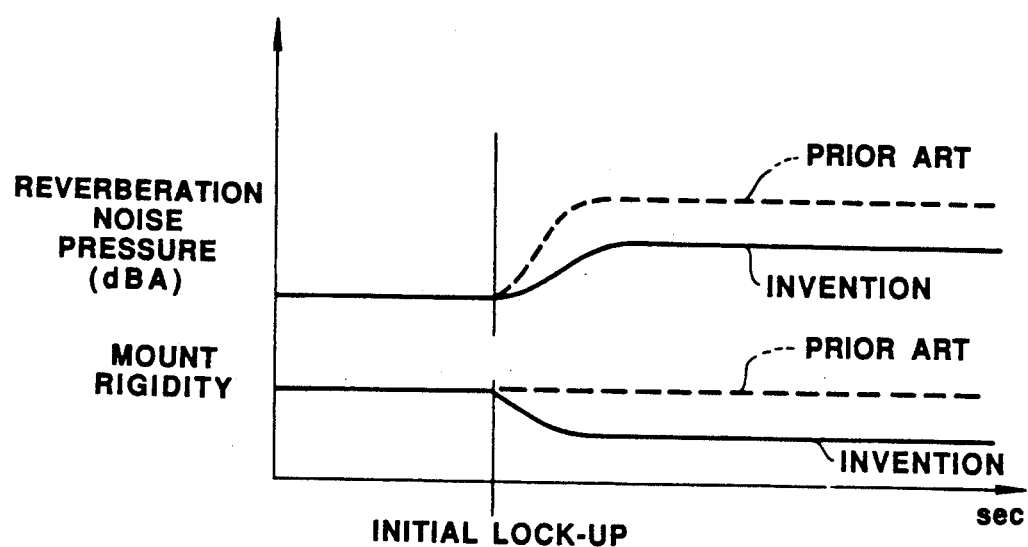
FIG. 13 shows the changes in noise level and mount rigidity which occur in accordance with the present invention during full lock-up operation.
Figure 14:
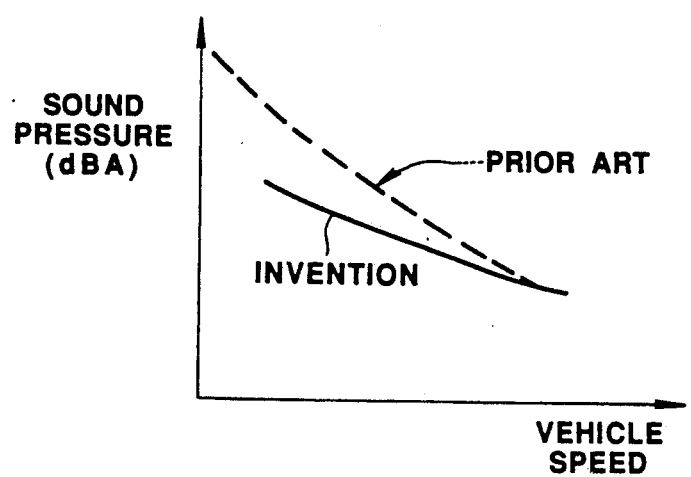
FIG. 14 is a graph which shows, in terms of vehicle speed and sound pressure, the reduction in reverberation noise level which is achieved with the present invention.

In addition to this, as shown in FIG. 13 the control which is provided in accordance with the present invention is such as to reduce the reverberation noise pressure which tends to be produced in response to relatively high frequency vibration. Further, as shown in FIG. 14, at low vehicle speeds the sound pressure produced by the reverberation is subject to a large reduction.

It will of course be understood that the arrangement illustrated in FIG. 2 is schematic and that the A/T control unit 24, the rigidity control means 32 and the correction means 34 would in actual practice be included in a signal control unit. Further, the routines which are illustrated in FIGS. 3 and 4 would more than likely be run in a single microprocessors included in the control unit.

The various modifications and variations which can be made to the above described embodiment without departing from the scope of the present invention will be readily apparent to those skilled in the automotive control art.

What is claimed is:

1. In a vehicle
   a power unit, said power unit including a prime mover, a transmission and a lock-up clutch which forms part of a operative connection between said prime mover and said transmission, said lock-up clutch being selectively conditionable to assume one of a non-engaged state, a partially engaged state and a fully engaged state;
   a mount means supporting said power unit on a chassis of the vehicle, said mount being constructed and arranged such that the rigidity thereof can be selectively varied; and
   a control means operatively connected with said mount selectively having the rigidity of said mount in response to the engagement status of the lock-up clutch.

2. A vehicle as claimed in Claim 1 wherein said control means reduces the rigidity of said mount when said lock-up clutch assumes a fully engaged state.

3. A vehicle as claimed in claim 1 wherein said control means increases the rigidity of said mount when said lock-up clutch assumes a partially engaged state.

4. A vehicle as claimed in claim 1 wherein said control means comprises engine load sensing means and vehicle speed sensing means and compares the load and speed with mapped data in order to determine the selected rigidity of the mount.

5. A suspension control means for a suspension which supports an automotive power unit on a chassis, said power unit including a prime mover, a transmission and a lock-up clutch which forms part of a operative connection between said prime mover and said transmission, said lock-up clutch being selectively conditionable to assume one of a non-engaged state, a partially engaged state and a fully engaged state, said suspension control arrangement comprising: p1 a mount which supports and said power unit on a chassis of the vehicle, said mount being constructed and arranged such that the rigidity thereof can be selectively varied between a first high rigidity level and second lower rigidity level; and a control arrangement which is operatively connected with said mount and which selectively varies the rigidity of the said mount between said first and second levels in response to the engagement status of the lock-up clutch.

6. A suspension as claimed in claim 5 wherein said control means conditions said mount to exhibit the first high rigidity level in response to a partially engaged state of said lock-up clutch.

7. A suspension as claimed in claim 5 wherein said control means conditions said mount to exhibit the second low rigidity level in response to a fully engaged state of said lock-up clutch.

* * * * *